(12) United States Patent
Surowaniec (10) Patent No.: US 9,620,166 B2
(45) Date of Patent: Apr. 11, 2017

(54) METHODS FOR RESTORING OPTICAL DISCS

(71) Applicant: Venmill Industries, Oxford, MA (US)

(72) Inventor: Mariusz Surowaniec, Thompson, CT (US)

(73) Assignee: Venmill Industries, Oxford, MA (US)

( * ) Notice: Subject to any disclaimer, the term of this patent is extended or adjusted under 35 U.S.C. 154(b) by 93 days.

(21) Appl. No.: 14/401,967

(22) PCT Filed: May 16, 2013

(86) PCT No.: PCT/US2013/041304
§ 371 (c)(1),
(2) Date: Nov. 18, 2014

(87) PCT Pub. No.: WO2013/173559
PCT Pub. Date: Nov. 21, 2013

(65) Prior Publication Data
US 2015/0133037 A1    May 14, 2015

Related U.S. Application Data

(60) Provisional application No. 61/648,675, filed on May 18, 2012.

(51) Int. Cl.
*G11B 23/50* (2006.01)
*B24B 13/00* (2006.01)
*B24B 7/24* (2006.01)

(52) U.S. Cl.
CPC ............ *G11B 23/505* (2013.01); *B24B 7/241* (2013.01); *B24B 13/00* (2013.01)

(58) Field of Classification Search
CPC B24B 7/24; B24B 7/241; B24B 13/00; G11B 23/505
See application file for complete search history.

(56) References Cited

U.S. PATENT DOCUMENTS

| 5,860,181 | A | 1/1999 | Maekawa et al. |
| 5,954,566 | A | 9/1999 | Bauer |
| 6,099,393 | A | 8/2000 | Katagiri et al. |
| 6,261,159 | B1 | 7/2001 | Krieg et al. |
| 6,386,946 | B1 | 5/2002 | Lin et al. |
| 6,802,760 | B1 | 10/2004 | Goldstein |
| 6,869,344 | B2 | 3/2005 | Miyahara et al. |
| 7,014,543 | B1 | 3/2006 | Holbrook et al. |
| 7,625,263 | B2 | 12/2009 | Miyahara et al. |
| 8,045,440 | B2 | 10/2011 | Miyahara et al. |
| 8,123,592 | B2 * | 2/2012 | D'Alessandro ........... B24B 7/24 451/7 |
| 8,342,905 | B2 * | 1/2013 | Miyahara ........................ 451/2 |

(Continued)

FOREIGN PATENT DOCUMENTS

| EP | 2236245 A2 | 10/2010 |
| JP | 2000153450 A | 6/2000 |
| JP | 2007189196 A | 7/2007 |

*Primary Examiner* — Timothy V Eley
(74) *Attorney, Agent, or Firm* — Hayes Soloway PC (57) ABSTRACT

The invention relates to devices, systems and methods for restoring optical discs, including CD's, DVD's and Blu-ray discs. The invention provides an easy to use device for user's to repair optical discs without having to clean or remove rotating pads in the device between uses for the life of the pads of about 84 cycles.

20 Claims, 4 Drawing Sheets

(56) References Cited

U.S. PATENT DOCUMENTS

| | | |
|---|---|---|
| 2006/0166610 A1 | 7/2006 | Miyahara et al. |
| 2008/0212440 A1 | 9/2008 | Verschuren |
| 2011/0143636 A1 | 6/2011 | Miyahara |
| 2013/0181465 A1* | 7/2013 | Miyahara ............. G11B 23/505 294/90 |

* cited by examiner

FIGURE 4 ably. The invention further relates to restoration and repair

METHODS FOR RESTORING OPTICAL DISCS

CROSS REFERENCE TO RELATED-APPLICATION

This application claims priority to U.S. provisional application No. 61/648,375, filed May 18, 2012, and incorporates the entire contents thereof herein by reference.

FIELD OF THE INVENTION

The present invention relates to devices, methods and systems for restoring optical discs, with an automated pad cleaning mechanism. The invention provides an easy to use device for user's to repair optical discs without having to clean or remove rotating pads in the device between uses, until the life of the rotating pads has expired.

BACKGROUND OF THE INVENTION

The invention relates generally to restoration and repair devices for optical discs, namely for compact discs (CD's), digital versatile discs (DVD's) and Blu-ray discs. More particularly, the invention relates to methods, devices and systems that effectively restore a compact disc with a self-cleaning mechanism to restore the device after a restoration cycle, for continued repairs. The invention further relates to restoration and repair devices for compact discs with an automated pad cleaning means, for ease of use of a user.

Compact discs are made of several layers, a polycarbonate plastic layer, a reflective foil layer, a lacquer layer and a graphic layer. Data is burned into the polycarbonate plastic layer of a disc, and the next three layers, the reflective foil, lacquer and graphic layer combined are very thin and offer little to no protection against damage to the underlying data in the polycarbonate plastic of a disc. Similarly, Blu-ray discs use a shorter wavelength blue laser for improved reading of discs. Digital information is read from discs by infrared lasers, which reflects data to a laser reader in reflected beams to decode information contained on a disc.

CD's, DVD's and Blu-ray discs often get scratched or obtain fingerprints and blemishes through continued use or by accident. Scratches, imperfections, and gouges on Blu-ray disc surfaces may make data unreadable by laser readers. When this happens music discs skip tracks and DVD's skip frames, which interferes with proper disc playing, interrupting education and entertainment otherwise obtained from the disc. Various machines, methods and processes have been devised and constructed to cleanse or repair discs. The problem with prior art techniques include but are not limited to the following: 1) results in a messy machine, with a long clean-up process for users 2) unable to record and reproduce repaired data faithfully 3) not cost effective and difficult to manufacture, 4) results in waste, 5) raises environmental concerns, 6) not easy to install, use and operate, 7) many existing machines require cleaning or replacement of buffing pads between cleaning cycles, 8) many existing machines cannot repair blue-ray discs, 9) existing machines are meant to clean a disc, but not to actually repair a damaged disc.

As one example U.S. Pat. No. 5,860,181 discloses a method and apparatus for cleaning a work piece by scrubbing a work piece with a cleaning member. The cleaning member is described as an abrasive cloth that removes particles from the work piece in order to clean the work piece.

U.S. Pat. No. 5,954,566 discloses a method and apparatus for repairing a disc by removing material from the protective coating of the disc. The buffing element disclosed in the '566 patent is specifically disclosed to generate a coarse grade and abrading system to remove a protective coating from the disc. Similarly, in yet another reference, U.S. Pat. No. 6,386,946 discloses a compact disc repair system that requires grinding and polishing of the disc in order to repair the disc. Each of the aforementioned patents fall short as technologies unable to faithfully repair discs and machines which are unable to repair Blu-ray discs, or provide a self-cleaning mechanism for withstanding multiple repairs without requiring manual cleaning or replacement of cleaning pads.

Other related U.S. Patent References include U.S. Pat. Nos. 8,045,440; 6,869,344; 7,625,263; and US publication numbers 20060166610, and 20110143636. The 20110143636 application describes a device with intermittent flow of a compound and water for repairing a disc. In accordance with the methods described in this patent application, the intermittent flow of compound and water results in restoration temperatures that typically reaches about 150 degrees Fahrenheit, temperatures that may destroy data on an optical disc. Similarly, the 20110143636 application describes two rotating pads which require removal and cleaning between cycles, thereby creating risk of damage to a disc if a user has not removed and individually cleaned the pads between cycles.

The disc repair system in accordance with the present invention provides for the restoration and maintenance of all known CD Media, DVD's; single or double sided, including 3-inch discs with the use of a 3-inch adapter and Blu-ray discs. The device essentially comprises interaction of rotating pads, a water supply means for pre-moistening the pads prior to a restoration cycle, a continuous flow of abrasive compound during a restoration cycle, a continuous flow of water during a restoration cycle to maintain the restoration temperatures at about 100 to 115 degrees Fahrenheit, and a water supply means for cleaning abrasive compound off of the rotating pads at the end of a restoration cycle, in accordance with the present invention. In addition, in accordance with the present invention, the rotating pads may have one or more grooves, which assists in ease of removal of abrasive compound from the pads. In accordance with the present invention, a user can repair any optical disc, including Blu-ray discs, without having to remove and clean the pads between restoration cycles. In addition, a rotating disc motor in accordance with the present invention spins throughout the restoration cycle, including a final spinning cycle after water is used to remove abrasive compound from the pads, so that the disc is dry when it is removed from the device, for convenience of a user. Accordingly an advantage of the present invention is to provide a disc repair system for quickly and effectively repairing or maintaining all types of scratched or otherwise damaged discs with an automated cleaning system to effectively allow multiple repairs to be made without having to replace cleaning pads in the device. Another advantage of the invention is the ability of a user to repair a disc in one step, with a fully automated system that repairs a disc in a short time period. In accordance with this advantage, the user does not have to wipe, polish or clean the disc by hand. In a method described herein, a compact disc can be cleaned in thirty seconds and repaired in four minutes or less, allowing the user to clean or repair a disc just before playing the disc. As another advantage of the invention, the disc repair device is easily transportable and storable to operate as an attractive front counter device. In yet another advantage, the disc repair device may be used for many uses, for example 125, 4 minute disc repairs or 1,000, 30 second disc cleanings and the liquid catalyst and the rotating pads, water and abrasive compound may be replaced once the maximum uses have been completed, which may be prompted by a notification on the device. The disc repair device is made of durable materials, with an easy to use and aesthetically pleasing user interface, allowing for a long lasting machine with multiple use capacity.

Other objectives of this invention reside in its simplicity, elegance of design, ease of manufacture, service and use and even aesthetics, as will become apparent from the following brief description of the drawings and the detailed description of the concept embodiment.

SUMMARY OF THE INVENTION

Embodiments of the present invention provide devices, systems and methods of restoring optical discs, including CD's, DVD's and Blu-ray discs. In this regard, one embodiment of such a device, among others, can be broadly summarized by the following features: a hinged top with at least one rotating pad, a water supply means, an abrasive compound supply means, a rotating motor, a platter for loading a disc, at least one peristaltic pump, wherein said pump controls distribution of the water and the abrasive compound through at least one release channel to an optical disc and a self-cleaning rotating pad means, wherein the peristaltic pump manages release of water at the end of a restoration cycle to clean the at least one rotating pad.

The present invention can also be viewed as providing methods of restoring optical discs. In this regard, one embodiment of such a method, among others, can be broadly summarized by the following steps: pre-moistening rotating pads in an optical disc restoration apparatus, continuously applying an abrasive compound to an optical disc during a restoration cycle, continuously applying water to an optical disc during a restoration cycle, ending a restoration cycle, applying water to an optical disc after ending a restoration cycle, wherein the step of applying water to an optical disc after ending a restoration cycle results in removal of abrasive compound from the rotating pads, ending application of the water, and, rotating the disc as a drying step to remove the water from the disc.

The invention can further be described as a disc restoration apparatus with an automated pad cleaning system. In this regard, one embodiment of such a device, among others, can be broadly summarized including the following: one or more rotating pads, an abrasive compound supply means, wherein said abrasive compound is continuously applied to the surface of said optical disc during said restoration cycle, and a water supply means, wherein said water is supplied to the surface of said optical disc at least at the end of a restoration cycle, and wherein the water cleans said abrasive compound from the one or more pads.

Other devices, systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE FIGURES

Many aspects of the invention can be better understood with reference to the following drawings. The components in the drawings are not necessarily to scale, emphasis instead being placed upon clearly illustrating the principles of the present invention.

DETAILED DESCRIPTION OF THE INVENTION

The invention provides devices, systems and methods for restoring optical discs. The invention also provides a disc restoration apparatus with an automated rotating pad cleaning system.

DEFINITIONS

Unless otherwise defined, all technical and scientific terms used herein have the same meaning as commonly understood by one of ordinary skill in the art to which the invention belongs. Although methods and materials similar or equivalent to those described herein can be used in the practice or testing of devices, systems and methods featured in the invention, suitable methods and materials are described below.

For convenience, the meaning of certain terms and phrases employed in the specification, examples, and appended claims are provided below. The definitions are not meant to be limiting in nature and serve to provide a clearer understanding of certain aspects of the present invention.

The term "optical disc" as used herein refers to a disk coated with plastic that can store digital data as tiny pits etched in the surface; and is read with a laser that scans the surface including but not limited to Blu-ray discs, compact discs (CD's), digital video discs (DVD's), high definition digital video discs (HD-DVD's), computer discs, game discs, books on disc, all recordable CD's and DVD's, double-sided discs and 3-inch discs.

The term "abrasive compound" as used herein refers to any substance formed from two or more elements chemically combined that is capable of polishing or cleaning a hard surface by rubbing or grinding.

Devices for Restoring Optical Discs

In accordance with one embodiment of the present invention, a device for restoring optical discs is described. A device in accordance with one embodiment of the present invention includes but is not limited to the following features: a water supply means, wherein the water is supplied to the surface of an optical disc at the start of a restoration cycle, and an abrasive compound supply means, wherein the abrasive compound is continuously applied to the surface of an optical disc during the restoration cycle, and at least one rotating pad. In accordance with this embodiment the water supply means comprises a bottle that can hold 250 mL of water and can be refilled readily by a user. The water is stored in a bottle closed within the device for a users convenience in accordance with this embodiment, with a rear door on the device so that a user can refill the water in accordance with the device restoration instruction manual. In accordance with this embodiment, the water bottle is connected with tubes to a peristaltic pump, which runs continuously during a restoration cycle in accordance with the present invention. Similarly, in accordance with this embodiment, the abrasive compound supply means comprises a bottle with abrasive compound to last for about 500 minutes of cleaning and/or disc repair cycle time. The abrasive compound is stored in a bottle featured within the device for a user's convenience, with a rear door on the device so that a user can refill the abrasive compound in accordance with the device restoration instruction manual. In accordance with this embodiment, the abrasive compound is connected with tubes to a peristaltic pump, which runs continuously during a restoration cycle in accordance with the present invention. Tubes may carry the water and abrasive compound from the water bottle and abrasive compound bottle to peristaltic pumps, which may regulate the flow of water and abrasive compound during a restoration cycle. In addition, tubes may then carry the water and abrasive compound from the peristaltic pumps to one or more release channels, to release the water and compound onto an optical disc. In this embodiment 4 release channels may be provided for optimal cleaning and/or repair, 2 for water release and 2 for abrasive compound release.

Further, in accordance with this embodiment, the rotating pads may be petal-shaped buffing pads with grooves, so that the abrasive compound is easily removed from the rotating pads following a restoration cycle. In accordance with this embodiment, the two pads may be used to restore a disc, which may be used for about 84 minutes of optical disc cleaning and repair. In accordance with this embodiment, two sets of pads may be delivered with the device, so that a user may replace the pads after about 84 minutes of cleaning and/or repair. In addition, a Velcro holder may be placed on a pad holder for ease of installation of the pads. The grooves on the rotating pads may provide for ease of removal of abrasive compound from the pads compared to pads without grooves. In addition, in accordance with this embodiment, the water supply means may be used to pre-moisten the rotating pads prior to the start of a restoration cycle, as water is applied to the surface of an optical disc to pre-moisten the rotating pads 3 to 5 seconds before the start of a restoration cycle. In addition, in accordance with this embodiment, pre-moistening rotating pads may soften the pads prior to a restoration cycle, which may make the restoration cycle safer from any potential scratching of optical discs. In addition, at the end of a restoration cycle in accordance with the present embodiment, water may be applied to the optical disc at the end of a restoration cycle to clean abrasive compound off of the pads in an automated pad cleaning mechanism. For example, water may be applied for an additional 5 seconds or more at the end of a restoration cycle in an automated pad cleaning mechanism. In accordance with this embodiment, automated cleaning of the pads result in ease of use of the device by a user, with the ability to clean and restore discs about 30 to 100 times without having to replace or clean the pads, depending on the severity of damage to a disc.

The embodiment in accordance with the present invention may further include a center seal, which may be located between the rotating pads. In accordance with this embodiment, the center seal may cover the center of a disc during a restoration cycle, so that the center of an optical disc may be protected from water and/or abrasive compound during a restoration cycle. In addition, the center seal in accordance with the present invention may further hold an optical disc on a rubber platter during a restoration cycle, so that the disc remain centered as a rotating motor below the rubber platter spins the optical disc.

The present embodiment may further have a consumable counter chip, which may be located between the buffing solution and the water behind a rear door of the device. The abrasive compound, water and pads may be designed in accordance with the present embodiment to be replaced all at the same time, which may be after about 500 minutes of device operation. The consumable counter chip may be used to identify to a user the amount of consumables water and abrasive compound left in the device during use, so that a user knows when to refill the water and abrasive compound. In this embodiment the consumable counter chip may display the amount of consumable water and abrasive compound remaining on a user interface. The consumable counter chip may show the following indications: 100% full for 376-500 minutes of restoration time, 75% full for 251 to 375 minutes of restoration time, 50% full for 126-250 minutes of restoration time, 25% full for 1-125 minutes of restoration time and 0% full for 0 minutes of restoration time. In accordance with the present embodiment, the consumable counter chip will notify a user when the consumable water and abrasive compound are empty and may prevent any further restoration cycles until the water and/or abrasive compound is replaced and/or a new consumable counter chip is installed.

At the completion of a restoration procedure, water and abrasive compound that has been used in the restoration process may be collected in a catch below the rubber platter of the device. From the catch the water and the abrasive compound may be transferred to a holding reservoir. In the present embodiment, the holding reservoir may hold all of the water and compound solution required to clean discs for about 250 minutes. When the holding reservoir is full, a user may discard of the holding reservoir contents and reuse the holding reservoir for collecting water and abrasive compound from restoration cycles.

In accordance with this embodiment continuous release of water and abrasive compound has several benefits, including but not limited to: 1) continuous flow of abrasive compound allows for optimized disc restoration and friction reduction during the restoration process by decreasing the required pressure of the pads to enable restoration of a disc, 2) continuous flow of water throughout the restoration cycle reduces heat that builds up during the restoration cycle, maintaining the temperature during the restoration cycle at about ten to fifteen degrees Fahrenheit, a safe temperature for optical discs. Similarly the water supply means in accordance with the present embodiment of the invention provides several benefits to the disc restoration apparatus including but not limited to: 1) pre-moistening of the pads prepares the pads for optimized restoration with minimal friction between the pads and the optical disc 2) pre-moistening of the pads helps control heat build-up at the onset of the restoration cycle 3) applying water to the optical disc and pads at the end of the restoration cycle for about fifteen to twenty seconds cleans residue abrasive compound from the pads following the restoration cycle, thereby allowing the user to continue to repair discs without having to manually remove and clean the pads between cycles, for the life of the pads 4) applying water to the disc at the end of the restoration cycle removes any abrasive compound remaining on the disc and 5) applying water to the disc at the end of the restoration cycle removes abrasive compound surrounding the disc, making release of the disc easier for users. In addition, the center seal on the hinged top in accordance with this embodiment has several benefits in accordance with the present embodiment, including but not limited to: 1) it protects the center of the optical disc with an air tight seal, thereby preventing abrasive compound and water from entering the center of the disc during the restoration cycle, which could destroy the disc, 2) the center seal holds the disc on the rotating platform during the restoration cycle, thereby preventing the disc from releasing from the rotating platform during a restoration cycle.

Further in accordance with the present invention, a power cord may be provided for powering the device. In accordance with this embodiment, the power cord may be installed into a power inlet on the rear of the device and then plugged into a wall outlet for powering the device.

In addition, in accordance with the present invention, a user keypad may be provided for ease of use to clean and/or repair an optical disc. One or more buttons may be provided on a user keypad to prompt a user to select a length of time for an optical disc restoration cycle, which may range from a 30 second cycle to a 4 minute cycle. The restoration time may depend on the severity of damage to an optical disc. In accordance with this embodiment, to select a desired restoration time for a CD, DVD, computer disc, game disc, book on disc and/or double sided disc, a button for regular repair may be pressed on a user keypad until the desired restoration time appears on an interface display. A user may then close a top cover and a restoration cycle may be initiated. Similarly to select a desired restoration time for a Blu-ray or PS3 disc, a Blu-ray button may be pressed on a user keypad until the desired restoration time appears on an interface display. A user may then close a top cover and a restoration cycle may be initiated. In addition, in accordance with the embodiment described, a user may desire to stop a restoration cycle prematurely, in which case a user may press any button on a user keypad to stop a cycle so that the top cover opens automatically. An error message may further be provided on the display window when a restoration cycle has been abruptly changed, in accordance with the present invention.

In accordance with the present invention, when a device is first used, a user may prepare the device for use to clean air in the device tubing with one or more of the following steps: 1) turning on the power to the device by pressing an on/off switch, 2) keep a container under the release channels in the top cover of the device, 3) press the compound or C button on the user keypad to start the flow of the abrasive compound 4) press the water or W button on the user keypad to start the flow of water 5) press the compound or C button to stop the flow of abrasive compound 6) press the water or W button on the user keypad to stop the flow of water.

Figure 1:
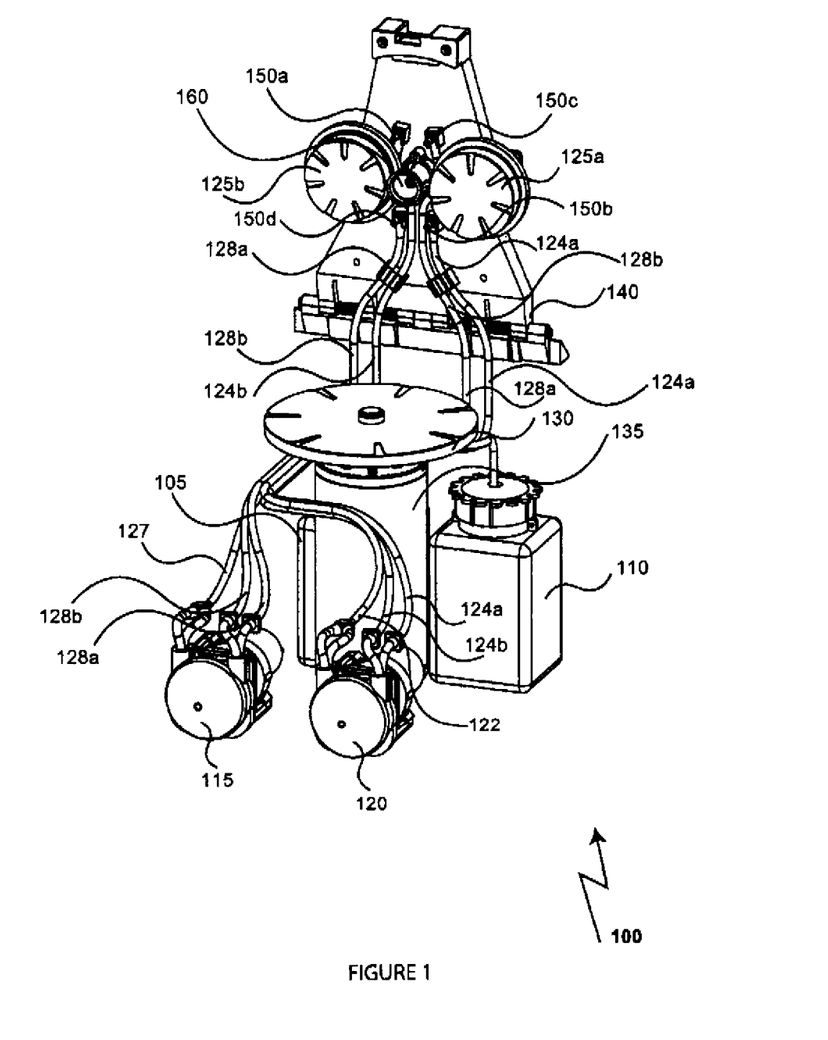
FIG. 1 shows a front view of an optical disc restoration apparatus in accordance with one embodiment of the present invention.

In accordance with another embodiment shown in FIG. 1 a device 100 is shown. In accordance with this embodiment, a water bottle 105 and the abrasive compound bottle 110 may be located at the rear of the device, within the device 100, as described. In accordance with this embodiment, tube 127 carries water and tube 122 carries abrasive compound from the water bottle 105 and the abrasive compound bottle 110 respectively, to the peristaltic pumps 115 and 120 respectively. Tubes 128a and 128b carry water to release channels 150c and 150d respectively and tubes 124a and 124b carry abrasive compound from the peristaltic pumps to release channels 150b and 150a respectively. In accordance with this embodiment, water may be released from release channels 150a and 150b prior to the restoration cycle to pre-moisten rotating pads 125a and 125b. In accordance with this step of pre-moistening the rotating pads 125a and 125b, a user may simply load an optical disc onto a rubber platform 130 to be repaired, which may be rotated by a motor 135, close the hinged top 140 containing the rotating pads 125a and 125b and press the restoration cycle of choice from the user interface. Prior to the onset of a restoration cycle, in this embodiment water may be dispersed onto the optical side of a disc and the rotating pads 125a and 125b may be rotated onto the disc to absorb the water and pre-moisten the pads 125a and 125b prior to a restoration cycle. Similarly, in this embodiment, tube 122 may carry abrasive compound from the abrasive compound bottle 110 to a peristaltic pump and through tube 124a and 124b to release channels 150b and 150a respectively. In this embodiment, abrasive compound is released onto the optical disc continuously during the restoration cycle. Finally, in accordance with the present embodiment center seal 160 is provided to protect the center of the disc from abrasive compound and water and to hold the disc in place during a restoration cycle.

Figure 2:
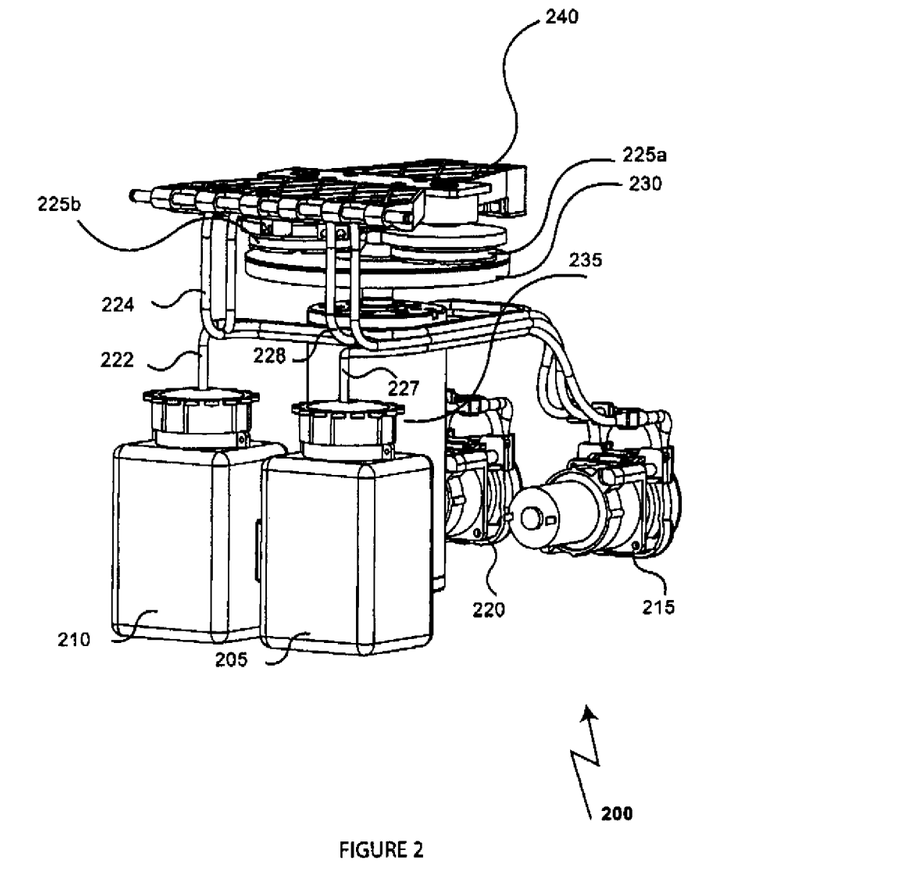
FIG. 2 shows a perspective view of an optical disc restoration apparatus in accordance with one embodiment of the present invention.

In yet another embodiment shown in FIG. 2, a device 200 is shown with a hinged top 240 in a downward position to restore a disc on a rubber platter 230. The rubber platter 230 and the peristaltic pumps 215 and 220 may be controlled with a rotating motor 235 to continuously flow water and abrasive compound to an optical disc during a restoration process. Tubes 222 and 227 may be used to carry abrasive compound and water to the peristaltic pumps 220 and 215 respectively, and tube 224 and 228 may be used to carry abrasive compound and water to the optical disc and rotating pads 225a and 225b during a restoration cycle. In accordance with this embodiment, a user may simply load a disc to initiate a restoration cycle.

Methods of Restoring Optical Discs

In accordance with another embodiment of the present invention, a method for restoring optical discs is described. The method in accordance with one embodiment of the present invention may include but is not limited to the following steps: 1) pre-moistening rotating pads in an optical disc restoration apparatus, 2) continuously applying an abrasive compound to an optical disc during a restoration cycle, 3) continuously applying water to an optical disc during a restoration cycle, 4) applying water to an optical disc after ending a restoration cycle, 5) ending application of water to the optical disc and 6) rotating the optical disc on a rubber platter to dry the disc for ease of use by a consumer. In accordance with this method, the step of pre-moistening the rotating pads helps reduce heat from friction between the rotating pads and the optical disc during a restoration cycle. In accordance with this method, the first step of pre-moistening the rotating pads is accomplished by applying water to the surface of an optical disc and rotating the pads on the optical disc for about five to fifteen seconds prior to the start of a restoration cycle. In a next step, of continuously applying an abrasive compound to an optical disc during a restoration cycle may help maintain the restoration temperature between the pads and the optical disc to about 110 to 115 degrees Fahrenheit. Continuous application of the abrasive compound further enhances the restoration process by allowing maximal repair of the optical layer of a disc in a short restoration period, for example, in about 30 seconds to about 4 minutes, which may reduce the restoration time by about one minute, compared to devices that intermittently apply an abrasive compound. In a next step of continuously supplying water to an optical disc during the restoration cycle, may assist in maintaining the disc at between about 110 to 115 degrees Fahrenheit. In accordance with the embodiment described, temperature maintenance during a restoration cycle is important, as temperatures greater than 120 degrees Fahrenheit may pose risk of damage to a disc. In particular reconditioning temperatures equal to or greater than 150 degrees Fahrenheit may pose serious threat of damage to a disc. In a next step of applying water to an optical disc after completion of a restoration cycle, abrasive compound remaining on the rotating pads may be washed out of the rotating pads in this steps, thereby leaving the rotating pads ready for reuse without requiring the user to remove the pads and manually clean the pads. In accordance with this embodiment, the pads may be used between about 30-100 times without having to be removed and cleaned, or replaced by a user, making the present method extremely convenient and effective for multiple disc repairs by one or more users. In a last step the optical disc platform may continue to rotate after the water rinsing application is stopped, thereby drying excess water from the disc for a user's convenience.

In another embodiment of the present invention, an automated pad cleaning apparatus for an optical disc restoration apparatus includes but is not limited to the following features: 1) one or more rotating pads, 2) an abrasive compound supply means, wherein the abrasive compound is continuously applied to the surface of said optical disc during the restoration cycle; and, 3) a water supply means, wherein the water is supplied to the surface of an optical disc at least at the end of a restoration cycle, wherein the water cleans the abrasive compound from the one or more pads. In accordance with this embodiment, the rotating pads are petal-shaped pads with grooves, wherein abrasive compound is easily removed from the pads in accordance with the water rinsing methods described, from the spaces in the grooves on the pad.

Figure 3:
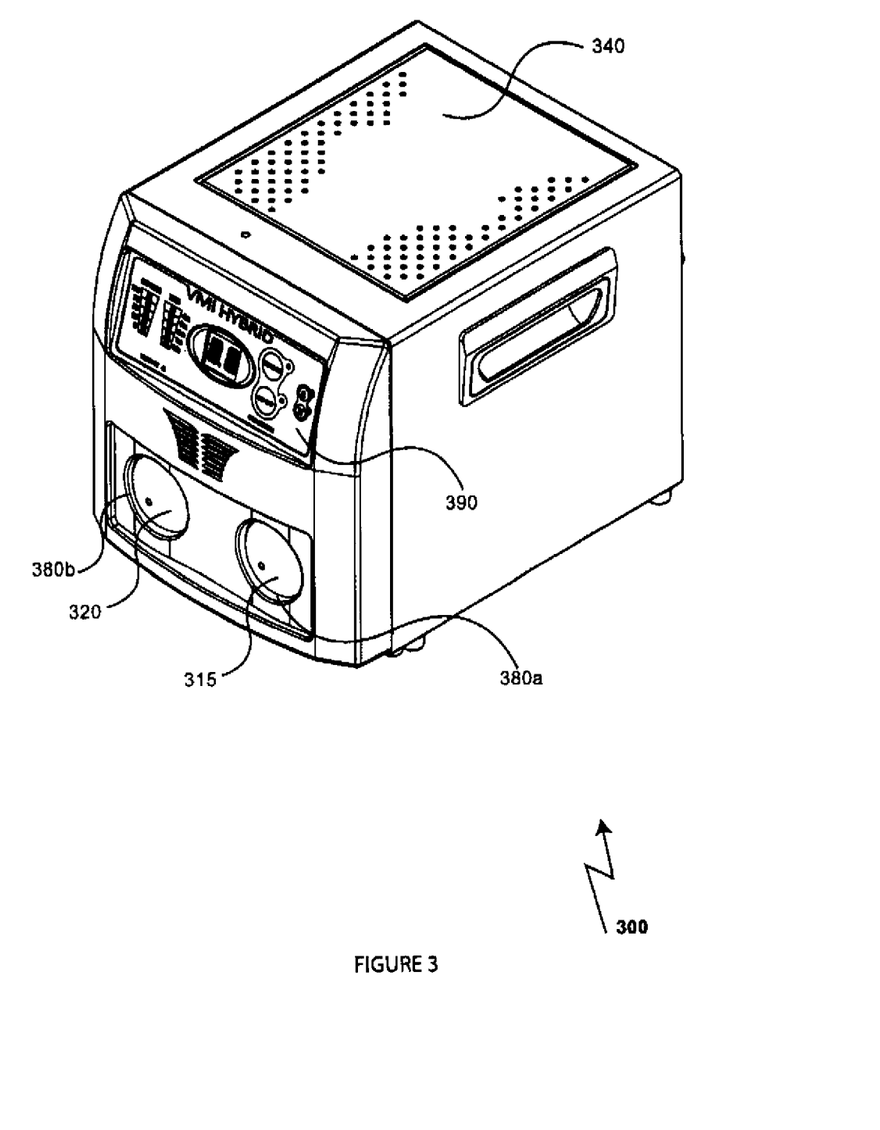
FIG. 3 shows a perspective view of an optical disc restoration apparatus in accordance with one embodiment of the present invention.

In accordance with one or more of the embodiments described a convenient and attractive apparatus is provided, so that the device may be readily placed on a users counter as an attractive restoration device, which may also be easily transported. In accordance with one embodiment of the invention, the water bottle and the abrasive compound bottle may be contained within the device, with a door so that a user can replace the water supply bottle and the abrasive compound supply bottle. In addition, in accordance with this embodiment, the front of the machine may have an attractive easy to use user keypad, and two transparent windows showing the peristaltic pumps for supplying water and compound to the device. FIG. 3 shows one embodiment of the device in accordance with the present invention, with the hinged top 340 shown in a closed, restoration cycle position. FIG. 3 further shows a user keypad 390 at the front of the machine, for the user's convenience, and two windows 380*a* and 380*b* for displaying peristaltic pumps 320 and 315 respectively.

Figure 4:
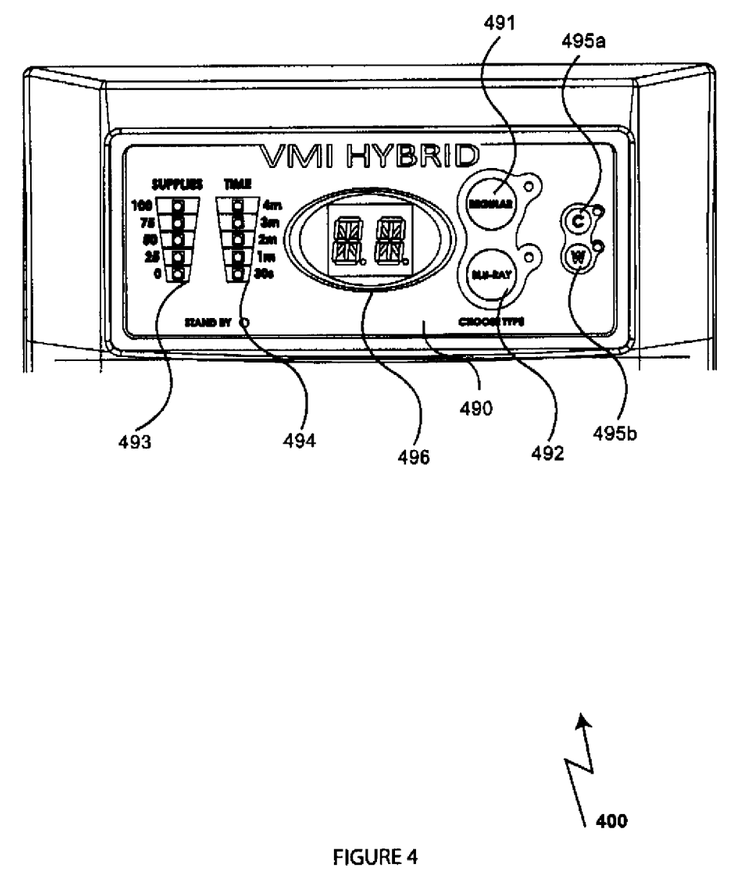
FIG. 4 shows a front view of a user interface on an optical disc restoration apparatus in accordance with another embodiment of the present invention.

In yet another embodiment of the present invention shown in FIG. 4, the user keypad 490 may be easy to use, with supplies shown, with a first start button 491 provided for repair of CD's or DVD's by a user and a second start button 492 provided for repair of Blu-ray discs. In accordance with this embodiment a user simply has to press the first start button 491 or the second start button 492 to set a time to repair a CD, DVD or Blu-ray disc. In this embodiment, a time display is provided 494 for the user's convenience, so that a user may choose and review the length of time for a pending repair, which may range from 30 second cycles to 4 minute cycles. In accordance with this embodiment a user may press the first start button 491 or the second start button 492 to choose to repair a CD, DVD or Blu-ray disc. Once a user presses the first or second start button, the time display 494 will illuminate and a user may press the first or second start button again to choose the length of time the user desires to restore the optical disc, ranging in this embodiment from 30 seconds to 4 minutes. In addition, in this embodiment, a supply display 493 may be provided to present the supply of abrasive compound and water in the abrasive compound bottle and the water supply bottle respectively. At the start of a restoration cycle when the device is first purchased, it may be important to prepare the tubes carrying the abrasive compound and the water. In accordance with this embodiment, preparation button C, 495*a* for the abrasive compound, and preparation button W, 495*b* for the water, may be provided so that a user may prepare the tubes in the device when the device is first purchased. In addition, in accordance with this embodiment, a supply display 493 will indicate if the abrasive compound bottle is 100%, 75%, 50% or 25% full, or otherwise, reading 0. In accordance with the instruction manual and frequency of use of the machine, a user may be prompted to purchase replacement abrasive compound bottle or be prompted to refill the water bottle when the supply display 493 reads at 50% full, or for infrequent users, when the supply display 493 reads at 25% full. In addition the user keypad 490 may also contain an interface display 496, wherein the restoration time is shown to a user to display a restoration time countdown during a restoration cycle.

In accordance with the embodiments described herein, the restoration display window may include a variety of information for a user's convenience, including but not limited to restoration cycle times, supply notifications when water and abrasive compound are low, notifications when machine maintenance requirements are needed, error notifications, and decorative designs, lights and colors that are aesthetically pleasing to a user.

It should be emphasized that the above-described embodiments of the present invention, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein, within the scope of this disclosure and the present invention and protected by the following claims.

The invention claimed is:

1. An improved method of restoring an optical disc with a self-cleaning pad mechanism comprising the steps of: pre-moistening rotating pads in an optical disc restoration apparatus; continuously flowing an abrasive compound onto said optical disc during a restoration cycle; continuously applying water to said optical disc during said restoration cycle; contacting said rotating pads to said optical disk; ending said restoration cycle; applying water to said optical disc after ending said restoration cycle, wherein said step of applying water to said optical disc after ending a restoration cycle results in removal of abrasive compound from said rotating pads; ending application of said water; and, rotating said disc as a drying step to remove said water from said optical disc.

2. The improved method of claim 1 further including the step of cleaning said rotating pads during said pre-moistening step.

3. The improved method of claim 1 further including the step of reducing friction between said rotating pads and said optical disc.

4. The improved method claim 1 further including the step of reducing friction between said rotating pads and said optical disc during said pre-moistening step.

5. The improved method of claim 1 further including the step of protecting the center of said optical disc during a restoration cycle with a center seal.

6. The improved method in accordance with claim 5 further including the step of holding said optical disc on an optical disc platform during said restoration cycle with said center seal.

7. The improved method in accordance with claim 1 further including the step of reducing a temperature of the optical disc during said restoration cycle, wherein said water reduces temperature during said restoration cycle.

8. The improved method in accordance with claim 1, wherein at least one of said rotating pads further comprise a petal-shaped pad.

9. The improved method in accordance with claim 1, wherein at least one of said rotating pads is formed with a plurality of grooves.

10. An improved method of restoring an optical disc with a self-cleaning pad mechanism comprising the steps of: continuously flowing an abrasive compound onto said optical disc during a restoration cycle; continuously applying water to said optical disc during said restoration cycle; contacting said rotating pads to said optical disk; ending said restoration cycle; applying water to said optical disc after ending said restoration cycle, wherein said step of applying water to said optical disc after ending a restoration cycle results in removal of abrasive compound from said rotating pads; and, ending application of said water.

11. The improved method in accordance with claim 10 further including the step of pre-moistening rotating pads in an optical disc restoration apparatus.

12. The improved method of claim 11 further including the step of cleaning said rotating pads during said pre-moistening step.

13. The improved method claim 11 further including the step of reducing friction between said rotating pads and said optical disc during said pre-moistening step.

14. The improved method in accordance with claim 10 further including the step of rotating said disc after ending application of said water, as a drying step to remove said water from said optical disc.

15. The improved method of claim 10 further including the step of reducing friction between said rotating pads and said optical disc.

16. The improved method of claim 10 further including the step of protecting the center of said optical disc during a restoration cycle with a center seal.

17. The improved method in accordance with claim 16 further including the step of holding said optical disc on an optical disc platform during said restoration cycle with said center seal.

18. The improved method in accordance with claim 10 further including the step of reducing a temperature of the optical disc during said restoration cycle, wherein said water reduces temperature during said restoration cycle.

19. The improved method in accordance with claim 10, wherein at least one of said rotating pads further comprise a petal-shaped pad.

20. The improved method in accordance with claim 10, wherein at least one of said rotating pads is formed with a plurality of grooves.

* * * * *